Patented Feb. 26, 1935

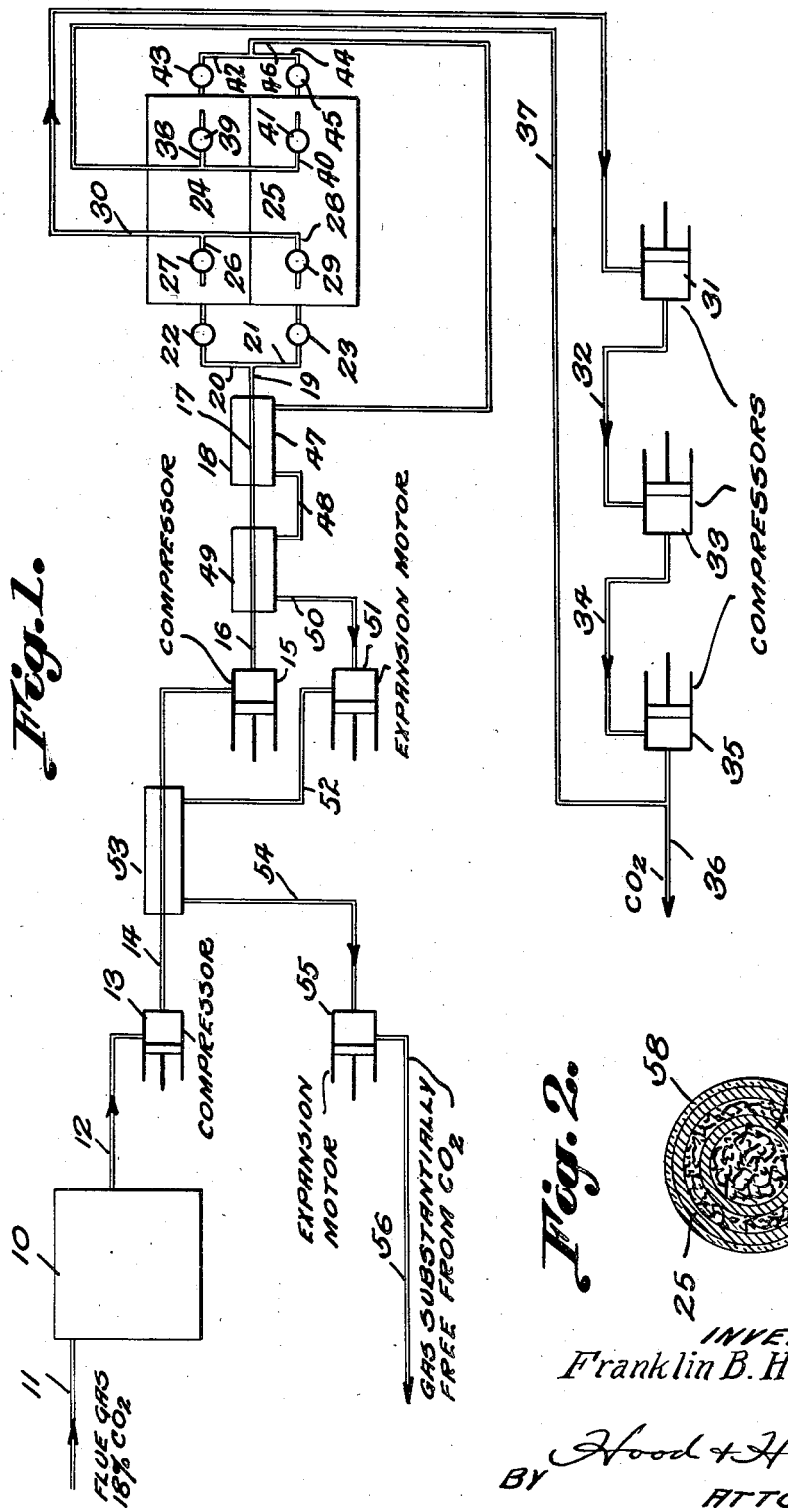

1,992,486

UNITED STATES PATENT OFFICE 1,992,486

METHOD OF AND APPARATUS FOR OBTAINING CARBON DIOXIDE

Franklin B. Hunt, Chicago, Ill., assignor to The Liquid Carbonic Corporation, Chicago, Ill., a corporation of Delaware Application November 18, 1931, Serial No. 575,780

18 Claims. (Cl. 62—121)

The present application relates to a method of and apparatus for obtaining carbon dioxide in a high state of purity. While the method will be described upon the basis of using flue gas as the source of carbon dioxide, it will be understood that the method and the apparatus are applicable to use in treatment of any other gaseous mixture containing an appreciable amount of carbon dioxide.

An object of the invention is to provide a method of and means for obtaining carbon dioxide of a very high degree of purity with a minimum expenditure of power. A further object of the invention is to provide a method and apparatus which will separate from a gaseous mixture substantially all of the carbon dioxide contained therein. A further object is to provide a commercially practical method for separating carbon dioxide from a gaseous mixture by direct precipitation of the carbon dioxide in the solid phase, and to provide apparatus for carrying out that method. A further object of the invention is to provide a regenerative process, wherein the energy required to lower the temperature of the gaseous mixture to a point at which the carbon dioxide may be precipitated is substantially all recovered in a later step in the process. A still further object of the invention is to provide apparatus for carrying out the above-outlined regenerative process, the apparatus being so designed as to permit the recovery of a large portion of the energy expended in the preliminary compression of the gaseous mixture. A further object of the invention is to provide apparatus for carrying out the above-outlined regenerative process, the apparatus being so designed that heat unavoidably generated in certain steps of the process may be utilized in other steps of the process. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, or in the specific steps stated, so long as the scope of the appended claims is not violated.

Fig. 1 is a diagrammatic illustration of apparatus embodying my invention; and

Fig. 2 is a transverse section through the precipitating chambers.

The commercial art of separating carbon dioxide, in a relatively pure state, from gaseous mixtures is comparatively young. Some four or five methods have been in commercial use, but of these, the so called lye process is the one which has been used commercially almost to the exclusion of all others. The lye process is quite efficient, if only the purity of the end product is considered, but it is very inefficient from the standpoint of the expenditure of energy. A primary reason for the inefficiency of this process lies in the fact that the absorbent solution must be cooled to increase its absorptivity for carbon dioxide, and then must be heated to drive off the carbon dioxide. Operating conditions and costs limit the maximum and minimum temperatures of the solution, with the result that considerably less than the total mass of carbon dioxide in the gaseous mixture is absorbed in the lye solution, and considerably less than all of the carbon dioxide absorbed in the lye solution is driven off when the solution is heated.

According to the present invention, the absorbing medium is entirely dispensed with, and substantially the total mass of carbon dioxide in the gaseous mixture is directly precipitated from the mixture in the solid phase. I have found that it is essential that none of the carbon dioxide shall pass through the liquid phase before entering the solid phase, for the reason that gaseous nitrogen, and certain other gases contained in the usual commercial mixtures, are appreciably soluble in liquid carbon dioxide. If the carbon dioxide is permitted to pass through the liquid phase, nitrogen and other impurities are dissolved therein, and these impurities are retained when the carbon dioxide passes from the liquid phase into the solid phase.

Liquid carbon dioxide can not exist at any temperature unless the pressure of the carbon dioxide is at least equal to 75 pounds per square inch, absolute. It is therefore essential to my process to keep the pressure of the carbon dioxide below this maximum.

On the other hand, solid carbon dioxide can exist at relatively high temperatures, depending upon the pressure impressed upon the solid. For instance, solid carbon dioxide can be precipitated from the gas at a pressure of 75 pounds per square inch, absolute, and at a temperature of −70° F. If, however, the pressure of the carbon dioxide is reduced to approximately 15 pounds per square inch, absolute, solid carbon dioxide will not be formed at a temperature above approximately −110° F. For this reason, it is desirable to initiate precipitation of solid carbon dioxide from the gaseous mixture under pressure conditions such that the partial pressure of carbon dioxide in the mixture is very slightly less than 75 pounds per square inch, absolute. As the carbon dioxide is precipitated, the percentage of carbon dioxide in the mixture is, of course, reduced, and the partial pressure of carbon dioxide is correspondingly reduced. It is necessary, therefore, to maintain substantially the initial pressure of the mixture in order to obtain a relatively high percentage of separation without the necessity of carrying the temperature to impracticably low values.

The present process comprises, essentially, the steps of compressing a gaseous mixture to a degree sufficient to bring the partial pressure of the carbon dioxide therein to a value slightly less than 75 pounds per square inch, absolute; cooling the compressed mixture, while maintaining substantially the above-mentioned total pressure thereon to effect solidification and precipitation of the carbon dioxide from the mixture; and then evaporating the solid carbon dioxide, while maintaining thereon a relatively low pressure, to cool another charge of compressed mixture to effect solidification and precipitation of the carbon dioxide from the new charge. It will be seen, thus, that my method is what may be termed a regenerative method of carbon dioxide precipitation.

Referring, now, to the drawing, it will be seen that I have illustrated a chamber 10 adapted to receive, through a conduit 11, flue gases, or any other gaseous mixture containing an appreciable percentage of carbon dioxide. Preferably, the flue gases will be cooled to a temperature of approximately 80° F. before they leave the chamber 10, but this is not absolutely necessary.

A conduit 12 leads from the chamber 10 to a compressor 13 which compresses the gaseous mixture and passes the same onward through a conduit 14 to a second compressor 15. While the desired compression of the gases might be obtained through the use of one compressor only, I prefer to effect the compression in two or more stages, for a reason which will appear hereinafter. As will appear hereinafter, the gaseous mixture leaving the compressor 14 is cooled before it enters the compressor 15.

Ordinary commercial flue gas obtainable at carbon dioxide separation plants usually contains approximately 18% carbon dioxide. Thus it will be seen that, if the mixture is compressed to a total pressure of approximately 375 pounds per square inch, absolute, the partial pressure of the carbon dioxide will be approximately 67.5 pounds per square inch, absolute. I prefer to set the compressor 13 to bring the total pressure of the gaseous mixture to approximately 75 pounds per square inch, absolute; and to set the compressor 15 to bring the total pressure of the gaseous mixture to approximately 375 pounds per square inch, absolute. As has been stated, it is essential that the partial pressure of the carbon dioxide in the mixture shall not exceed 75 pounds per square inch, absolute. Since the carbon dioxide content of the mixture is somewhat variable during a day's run, and since that content some times attains to the value of 20%, it will be seen that a total pressure of 375 pounds per square inch, absolute, is a maximum which should not be exceeded, ordinarily.

A conduit 16 leads from the compressor 15 to one side 17 of a heat interchanger 18, and a conduit 19 leads from said heat interchanger portion 17.

The conduit 19 is provided with two branches 20 and 21, said branch 20 being controlled by a valve 22, and said branch 21 being controlled by a valve 23. The branch 20 is connected with the inlet of a chamber 24, and the branch 21 is connected with the inlet of an associated chamber 25.

Referring, now, to Fig. 2, it will be seen that the chambers 24 and 25 are concentrically arranged cylinders, the cylinder 24 being disposed within the cylinder 25. The cylinder 25 is of such diameter that its internal volume is substantially equal to the internal volume of the cylinder 24 plus the external volume of said cylinder 24. Thus it will be seen that the effective internal volume of the cylinder 25 is substantially equal to the internal volume of cylinder 24. The two cylinders 24 and 25 are lightly packed with steel wool 57. The functions of the steel wool are to accelerate the heat transfer between the contents of the two chambers, by providing a metal path therebetween; and to provide a nucleus upon which solid carbon dioxide may be precipitated from a gaseous mixture in either chamber.

The chamber 24 is provided with an outlet 26 controlled by a valve 27, and the chamber 25 is provided with an outlet 28 controlled by a valve 29. The outlets 26 and 28 are both connected to a conduit 30 leading to a compressor 31. Preferably, two or more other compressors 33 and 35 are connected in series to the compressor 31 by conduits 32 and 34, and a conduit 36 leads from the final compressor 35 to a container (not shown) for pure carbon dioxide.

A conduit 37 branches from the conduit 36, and is provided with a branch 38 controlled by a valve 39 and opening into the chamber 24, and a second branch 40 controlled by a valve 41 and opening into the chamber 25 for a purpose later to be described.

A conduit 42 controlled by a valve 43 is connected to a second outlet of the chamber 24, and a conduit 44 controlled by a valve 45 is connected to a second outlet of the chamber 25. The conduits 42 and 44 merge in a conduit 46 leading to the opposite side 47 of the above-mentioned heat interchanger 18. A conduit 48 leads from the side 47 of the heat interchanger 18 to a heater 49, from which leads a conduit 50 connected to the intake side of a fluid-pressure motor 51. A conduit 52 connects the exhaust side of the motor 51 with a second heater 53, said heater being connected by a conduit 54 with the intake side of a second fluid-pressure motor 55. A conduit 56 leads from the exhaust side of the fluid-pressure motor 55. While I have shown two fluid-pressure motors 51 and 55, it is to be understood that any practical number of motors may be used, all of said motors being connected in series to the side 47 of the heat interchanger 18.

Assuming that the illustrated plant has just been installed, and has never been operated, the operation is as follows. Solid carbon dioxide is charged, in any desired manner, into one of the concentrically arranged chambers, for instance, the chamber 24. The valves 22, 29, 39, 40, and 43 are closed, and the valves 23, 27, and 45 are opened. Flue gases, or any other gaseous mixture containing an appreciable quantity of carbon dioxide, are supplied to the system through the conduit 11. At some time after their generation and before they leave the chamber 10, the gases are suitably cooled to a temperature of approximately 80° F. The gases flow from the chamber 10 to the compressor 13, where the total pressure of the mixture is raised to approximately 75 pounds per square inch, absolute. This compression of the gases obviously raises the temperature thereof, and the gases will preferably be suitably cooled as they pass through the conduit 14 toward the compressor 15. The manner of cooling the gases will be discussed hereinafter. In the compressor 15, the pressure of the gaseous mixture is raised to approximately 375 pounds per square inch, absolute, and the mixture passes thence through the conduit 16 and the heat interchanger portion 17, through the conduits 19 and 21, and past the valve 23 into the chamber 25.

The valve 27 being open, it follows that the pressure within the chamber 24 will be not higher than atmospheric pressure. Since the compressors 31, 33, and 35 will be operating, and since the conduit 30 is connected to the intake side of the compressor 31, the pressure within the chamber 24 may be less than atmospheric pressure. The temperature of solid carbon dioxide at atmospheric pressure is substantially $-110°$ F.; and this temperature is still further reduced if the pressure impressed upon the solid mass is reduced. Because of the packing of steel wool, or the like, the rate of heat interchange between the chambers 24 and 25 is very high. Therefore, the gaseous mixture is rapidly cooled when it is introduced into the chamber 25.

The gaseous mixture enters the chamber 25 under a pressure such that the partial pressure of the carbon dioxide therein is between 65 pounds and 75 pounds per square inch, absolute. At a pressure of 75 pounds per square inch, absolute, carbon dioxide will begin to precipitate from the mixture in the solid phase at a temperature of $-70°$ F. I have found that temperatures between $-100°$ F. and $-110°$ F. can be attained in the chamber 25, without material difficulty, by the evaporation of solid carbon dioxide in the chamber 24, under a slight vacuum.

As the carbon dioxide precipitates out of the mixture, obviously the percentage of carbon dioxide in the mixture decreases, and the partial pressure of the carbon dioxide in the mixture likewise decreases. The reduction in the total pressure of the mixture due to the precipitation therefrom of the carbon dioxide is so small as to be practically negligible. With the low temperatures attainable, substantially 78% of the carbon dioxide in the mixture can be precipitated therefrom in the chamber 25. This is a substantially higher percentage of separation than can be obtained, ordinarily, through the use of the so called lye process. I have found that carbon dioxide having a purity of 99.5% can be easily obtained in this manner, and, as will be explained, the present process is materially more efficient from the standpoint of power consumption than is any prior commercial carbon dioxide separation process known to me.

Of course, in the chamber 25, the temperature of the whole mass of the gaseous mixture is reduced. Since the valve 45 is open (it being understood that the valve 45 is in the nature of a reduction valve, so that the pressure in the chamber 25 is not materially reduced thereby) the cold mixture from which the carbon dioxide has been precipitated flows out of the chamber 25 through the conduits 44 and 46 and to the side 47 of the heat interchanger 18. Heat is absorbed by this residual gas in the side 47 from the entering gas in the side 17, thus storing additional energy in the gas in the side 47. The residual gas then flows through the conduit 48 to the heat interchanger 49. I prefer to arrange the unit 49 in heat interchanging relation with the conduit 16 between the compressor 15 and the unit 18, whereby still further heat energy is absorbed by the residual gases from the entering mixture. The residual gases flow from the unit 49 through the conduit 50 to the fluid-pressure motor 51. Here, the residual gases are expanded, whereby the temperature thereof is again reduced and the residual mixture flows through the conduit 52 to the unit 53. I prefer to arrange the unit 53 in heat interchanging relation with the conduit 14 between the compressors 13 and 15, whereby heat energy is absorbed by the residual mixture from the entering mixture, thus reducing the temperature of the entering mixture after the entering mixture leaves the compressor 13.

From the unit 53, the residual mixture flows through the conduit 54 to the fluid-pressure motor 55, where the residual mixture is again expanded, with recovery of energy through operation of the motor 55. The conduit 56 may lead to still further heaters and fluid-pressure motors, or to any other apparatus, or to the atmosphere.

The energy recovered by the operation of the motors 51 and 55 by the residual mixture may be applied to the operation of the compressors 13 and 15, or to the operation of one or more of the compressors 31, 33, and 35. Of course, it will be obvious that some external energy must be introduced into the system, either through the medium of an external heater, or through the medium of an external motor, but it will also be clear that a very large proportion of the energy stored in the original gaseous mixture in the form of heat, is recovered and put back into the system to do useful work. The extremely high power efficiency of the present system is thus explained.

The pure gaseous carbon dioxide emitted by the evaporation of the solid carbon dioxide in the chamber 24 flows through the conduits 26 and 30 to the compressors 31, 33, and 35, and thence, through the conduit 36 to a container (not shown) for the pure carbon dioxide.

After all of the solid carbon dioxide in the chamber 24 has been evaporated, the valves 23 and 27 are closed, and the pressure in the chamber 25 is allowed to blow down to substantially atmospheric pressure, whereby all residual gases within the chamber 25 are exhausted therefrom, and the atmosphere in said chamber 25 is exhausted of all gases save pure carbon dioxide. Thereafter, the valve 45 is closed, and the valve 29 is opened. Thereafter, the valves 22 and 43 are opened, with the result that the above-described flow through the system is reversed. The entering mixture now is directed to the chamber 24, while the pure carbon dioxide emitted by the evaporation of the solid carbon dioxide in the chamber 25 is directed through the conduits 28 and 30 to the compressors 31, 33, and 35. It will thus be seen that the frigories stored in the solid carbon dioxide previously precipitated within the chamber 25 will be utilized to refrigerate the gaseous mixture introduced into the chamber 24, to effect precipitation of carbon dioxide in the solid phase from the mixture in the chamber 24. The operation of the system, with this reverse flow, is entirely analogous in the operation above described.

It may occasionally become necessary to compensate for heat losses through the external wall of the chamber 25 by the introduction of additional solid carbon dioxide to one or other of the chambers 24 and 25. Such introduction may be effected by opening the appropriate valve 39 or 41 and introducing pure carbon dioxide to one of the chambers through the conduit 37, it being understood that the carbon dioxide introduced through said conduit is at a very high pressure, and that the same is expanded as it enters the chamber 24 or 25, and is so solidified in the chamber.

Obviously, the chamber 25 is provided with an external sheathing 58 of heat-insulating material.

I claim as my invention:

1. A process of separating carbon dioxide from a gaseous mixture which consists in compressing the gaseous mixture to a point at which the partial pressure of the carbon dioxide is slightly less than 75 pounds per square inch, absolute, and thereafter cooling the gaseous mixture to a temperature approaching −110° F.

2. A process of separating carbon dioxide from a gaseous mixture which consists in compressing the gaseous mixture to a point at which the partial pressure of the carbon dioxide is slightly less than 75 pounds per square inch, absolute, and thereafter cooling the gaseous mixture to a temperature approaching −110° F, while substantially maintaining the initial total pressure of the mixture.

3. A process of separating carbon dioxide from a gaseous mixture which consists in compressing the gaseous mixture to a point at which the partial pressure of the carbon dioxide is slightly less than 75 pounds per square inch, absolute, and cooling such mixture, while substantially maintaining the initial total pressure of said mixture, whereby substantially the total mass of carbon dioxide in said mixture is precipitated directly in the solid phase.

4. The process of separating carbon dioxide from a gaseous mixture which consists in establishing a mass of carbon dioxide in the solid phase, and bringing a volume of such gaseous mixture into heat-exchanging relation with such mass, whereby such mixture is cooled by the evaporation of the solid carbon dioxide, to precipitate carbon dioxide from such mixture in the solid phase.

5. The process of separating carbon dioxide from a gaseous mixture which consists in establishing a mass of carbon dioxide in the solid phase, and bringing a volume of such gaseous mixture into heat-exchanging relation with such mass but out of direct contact therewith, whereby such mixture is cooled by the evaporation of the solid carbon dioxide, to precipitate carbon dioxide from such mixture in the solid phase.

6. The process of separating carbon dioxide from a gaseous mixture which consists in establishing a mass of carbon dioxide in the solid phase, compressing a volume of such mixture, and bringing the compressed mixture into heat-exchanging relation with said mass but out of direct contact therewith, whereby such mixture is cooled to effect precipitation of carbon dioxide therefrom in the solid phase.

7. The process of separating carbon dioxide from a gaseous mixture which consists in establishing a mass of carbon dioxide, in the solid phase, compressing a volume of such mixture, bringing the compressed mixture into heat-exchanging relation with said mass, but out of direct contact therewith, substantially maintaining the pressure of said mixture, and reducing the circumambient pressure impressed upon said mass.

8. The process of separating carbon dioxide from a gaseous mixture which consists in establishing in a chamber a mass of solid carbon dioxide, introducing into a second chamber arranged in heat-exchanging relation with said first chamber a compressed volume of such gaseous mixture, and maintaining in said second chamber a superatmospheric pressure, whereby the evaporation of the carbon dioxide in said first chamber cools the compressed mixture in said second chamber to effect direct precipitation, in the solid phase, of carbon dioxide from said mixture.

9. The process of separating carbon dioxide from a gaseous mixture which consists in establishing in a chamber a mass of solid carbon dioxide, introducing into a second chamber arranged in heat-exchanging relation with said first chamber a compressed volume of such gaseous mixture, maintaining in said second chamber a pressure above atmospheric pressure, and maintaining in said first chamber a pressure below atmospheric pressure, whereby the evaporation of the carbon dioxide in said first chamber cools the compressed mixture in said second chamber to effect direct precipitation, in the solid phase, of substantially the total mass of carbon dioxide in said mixture.

10. A continuous process of separating carbon dioxide from a gaseous mixture which consists in establishing a mass of solid carbon dioxide, bringing into indirect heat-exchanging relation with said mass a compressed volume of such mixture, permitting said mass to evaporate, whereby said volume is cooled and carbon dioxide is precipitated therefrom in the solid phase to establish a new mass of solid carbon dioxide, bringing into indirect heat-exchanging relation with said new mass a fresh volume of compressed mixture, and permitting said new mass to evaporate, whereby said fresh volume is cooled and still another mass of solid carbon dioxide is precipitated from said fresh volume.

11. A continuous process of separating carbon dioxide from a gaseous mixture which consists in establishing in a chamber a mass of solid carbon dioxide, introducing into a second chamber arranged in heat-exchanging relation with said first chamber a compressed volume of such mixture, permitting evaporation of said mass and drawing off the gaseous carbon dioxide from said first chamber, whereby the mixture in said second chamber is cooled and carbon dioxide is precipitated therefrom in the solid phase to form a mass of solid carbon dioxide in said second chamber, withdrawing from said second chamber the gases remaining therein after such precipitation, introducing into said first chamber a compressed volume of such mixture, and permitting evaporation of the mass in said second chamber and drawing off the gaseous carbon dioxide from said second chamber, whereby the mixture in said first chamber is cooled and carbon dioxide is precipitated therefrom to form a new mass of solid carbon dioxide in said first chamber.

12. A regenerative process of separating carbon dioxide from a gaseous mixture which consists in establishing in a chamber a mass of solid carbon dioxide, introducing into a second chamber arranged in heat-exchanging relation with said first chamber a volume of such mixture compressed to a value sufficient to make the partial pressure of carbon dioxide in the mixture slightly less than 75 pounds per square inch, absolute, permitting evaporation of said mass and drawing off the gaseous carbon dioxide from said first chamber while maintaining the pressure in said first chamber at a value less than 15 pounds per square inch, absolute, whereby the mixture in said second chamber is cooled and carbon dioxide is precipitated therefrom in the solid phase to form a mass of solid carbon dioxide in said second chamber, withdrawing from said second chamber the gases remaining therein after such precipitation, introducing into said first chamber a volume of such mixture compressed to a value sufficient to make the partial pressure of carbon dioxide in the mixture slightly less than 75 pounds per square inch, absolute, and permitting evaporation of the mass in said second chamber and drawing off the gaseous carbon dioxide from said second chamber while maintaining the pressure in said second chamber at a value less than 15 pounds per square inch, absolute, whereby the mixture in said first chamber is cooled and carbon dioxide is precipitated therefrom to form a new mass of solid carbon dioxide in said first chamber.

13. Apparatus of the character described, comprising a pair of chambers arranged in heat-interchanging relation, means for supplying a gaseous mixture, under pressure, to said chambers, said means including conduits leading from a source of gas to said chambers and valve means for directing flow alternatively to said chambers, outlet means for said chambers comprising a first conduit and a second conduit leading from each of said chambers, and valve means operable to direct flow from one chamber through its first conduit and from the other chamber through its second conduit, or vice versa.

14. In combination, a source of gaseous mixture under pressure, a receptacle for gaseous carbon dioxide, a chamber, a second chamber arranged in heat-exchanging relation with said first chamber, connections between said source and said chambers, connections between said chambers and said receptacle, and valve means for directing flow, at times, from said source to said first chamber and from said second chamber to said receptacle, and, at other times, from said source to said second chamber and from said first chamber to said receptacle.

15. Apparatus for separating from a gaseous mixture a component capable of solidifying without passing through a liquid phase, comprising a pair of chambers adapted alternatively to contain a refrigerating medium, and arranged in heat-exchanging relation with each other, a source of gaseous mixture, a conduit connecting said source alternatively with either of said chambers, a compressor connected in said conduit between said source and said chambers, a fluid-pressure motor, and a conduit connecting said chambers alternatively with said motor, a portion of said last-named conduit being arranged in heat-exchanging relation with a portion of said first-named conduit.

16. Apparatus for separating carbon dioxide from a gaseous mixture, comprising a chamber containing solid carbon dioxide, a second chamber arranged in heat-exchanging relation with said first chamber, a source of gaseous mixture, a conduit connecting said source with said second chamber, a compressor connected in said conduit, a second compressor connected in said conduit, said compressors supplying said mixture to said second chamber at a pressure such that the partial pressure of carbon dioxide in such mixture is slightly less than 75 pounds per square inch, absolute, a container for carbon dioxide, a conduit connecting said first chamber with said container and adapted to conduct the gas emitted by the evaporation of the solid carbon dioxide in said first chamber to said container, a fluid-pressure motor, a second fluid-pressure motor, and a conduit connecting said second chamber to both of said motors in series, a portion of said last-named conduit between said second chamber and said first motor being arranged in heat-exchanging relation with a portion of said first-named conduit between said second compressor and said second chamber, and a portion of said last-named conduit between said first and second motors being arranged in heat-exchanging relation with a portion of said first-named conduit between said first and second compressors.

17. Regenerative apparatus for separating carbon dioxide from a gaseous mixture, comprising a chamber, a second chamber arranged in heat-exchanging relation with said first chamber, a source of gaseous mixture, a conduit connecting said source with said second chamber and with said first chamber, valve means for alternatively directing flow through said conduit to said second chamber or said first chamber, a compressor connected in said conduit, a second compressor connected in said conduit, said compressors supplying said mixture to said chambers at a pressure such that the partial pressure of carbon dioxide in such mixture is slightly less than 75 pounds per square inch, absolute, a container for carbon dioxide, a conduit connecting said first chamber and said second chamber with said container and adapted to conduct gaseous carbon dioxide from said chambers to said container, valve means for alternatively directing flow from said first chamber or from said second chamber to said container, a compressor connected in said last-mentioned conduit, a fluid-pressure motor, a second fluid-pressure motor, one of said motors being connected to drive one of said compressors, and a conduit connecting said second chamber and said first chamber to said motors in series, valve means for directing flow alternatively from said second chamber or from said first chamber to said motors, a portion of said last-named conduit between said chambers and said first motor being arranged in heat-exchanging relation with a portion of said first-named conduit between said second compressor and said chambers, and a portion of said last-named conduit between said first and second motors being arranged in heat-exchanging relation with a portion of said first-named conduit between said first and second compressors, said valve means being operable to effect flow of carbon-dioxide gas from said first chamber to said container when gaseous mixture is flowing to said second chamber and when compressed gas is flowing from said second chamber to said motors, and to effect flow of carbon dioxide gas from said second chamber to said container when gaseous mixture is flowing to said first chamber and when compressed gas is flowing from said first chamber to said motors.

18. Structure responding to claim 17, and including a conduit connecting the outlet of the last-named compressor with said chambers, and valve means for selectively directing flow from said compressor to said chambers.

FRANKLIN B. HUNT.